United States Patent [19]

Hunt

[11] 4,199,943

[45] Apr. 29, 1980

[54] FLUID TRANSMISSION CIRCUIT

[75] Inventor: William A. Hunt, Tynemouth, England

[73] Assignee: Eimco (Great Britain) Limited, Team Valley, England

[21] Appl. No.: 863,041

[22] Filed: Dec. 21, 1977

[30] Foreign Application Priority Data

Dec. 24, 1976 [GB] United Kingdom ............... 54057/76

[51] Int. Cl.[2] ............................................. F15B 13/09

[52] U.S. Cl. ...................................... 60/430; 417/288; 417/426; 60/486

[58] Field of Search ................. 60/428, 429, 430, 486; 417/286, 288, 426, 427

[56] References Cited

U.S. PATENT DOCUMENTS

| | | | |
|---|---|---|---|
| 2,074,618 | 3/1937 | Roeder | 60/430 X |
| 2,549,897 | 4/1951 | Evrell | 60/429 X |
| 2,933,897 | 4/1960 | Toutant | 60/486 X |

*Primary Examiner*—Edgar W. Geoghegan
*Attorney, Agent, or Firm*—McCormick, Paulding & Huber

[57] ABSTRACT

A fluid transmission circuit in which three or more pumps, adapted to be driven in unison by a prime mover operating at constant power output, draw fluid from a reservoir and deliver it to a reversible fluid motor via a control valve incorporating forward, neutral and reverse positions, the motor being driven, when the circuit is in use, against a fluctuating resistive force. The fluid outputs of two or more of said pumps are controlled by the output of a diverting valve whose input is connected by a separate pressure-sensing line to the fluid flow through the motor and which is initially biassed into a position in which each of said fluid outputs from said pumps is delivered to the motor. The arrangement is such that, as the demands on the motor increase and the pressure of fluid passing through the motor rises through a succession of predetermined levels, the pressure-sensing line will sense the rises in pressure and, at each successive pressure level, will cause the diverting valve automatically to divert the fluid outputs of successive ones of said pumps back to the reservoir without passing through the motor, the pump outputs being automatically switched into the motor supply line again, one after the other and in the reverse order from that in which they were switched out, by the diverting valve as the demand on the motor subsequently falls.

2 Claims, 4 Drawing Figures

PM
HP
T
SC
V1
V2
V3
SC
P1
P2
P3
P4
PS
RV
DV
F
N
R
MF

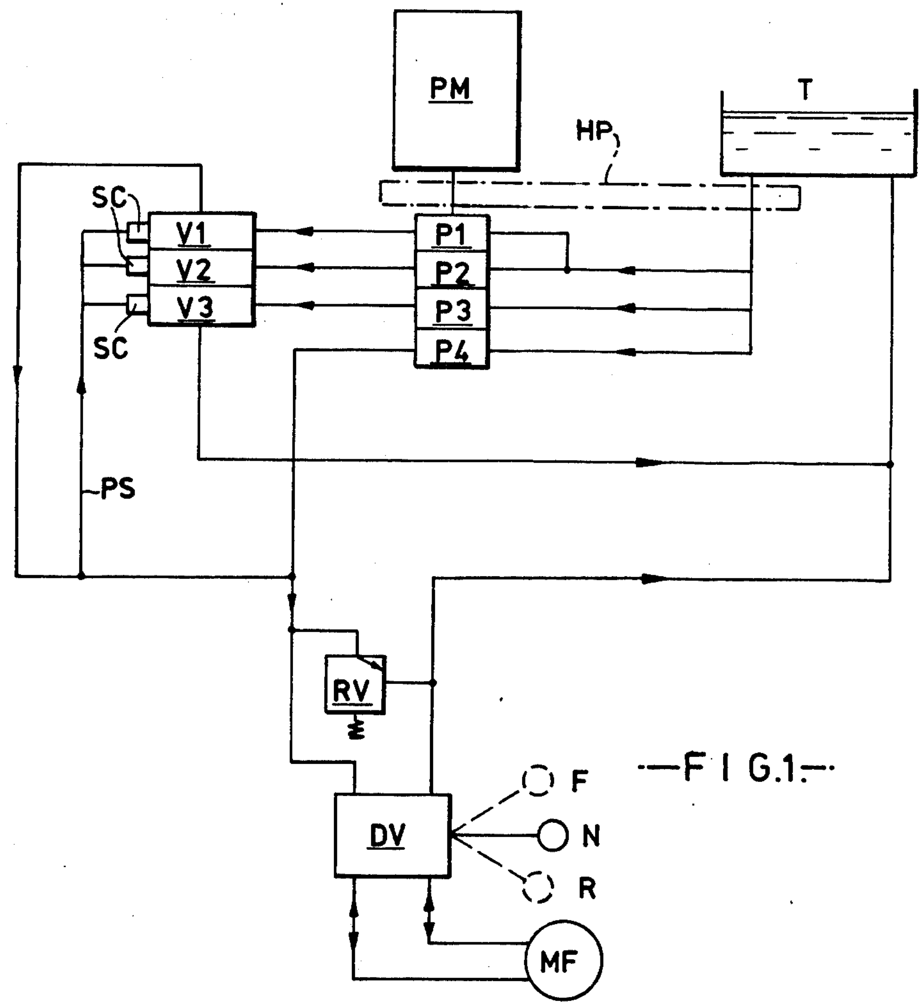
—F I G.1—
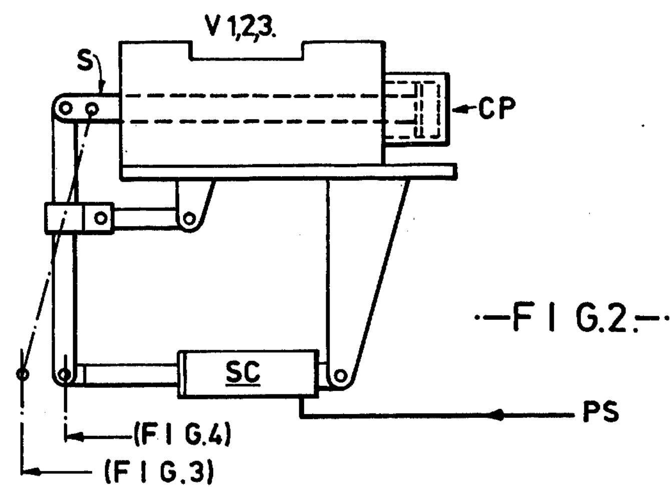
—F I G.2—

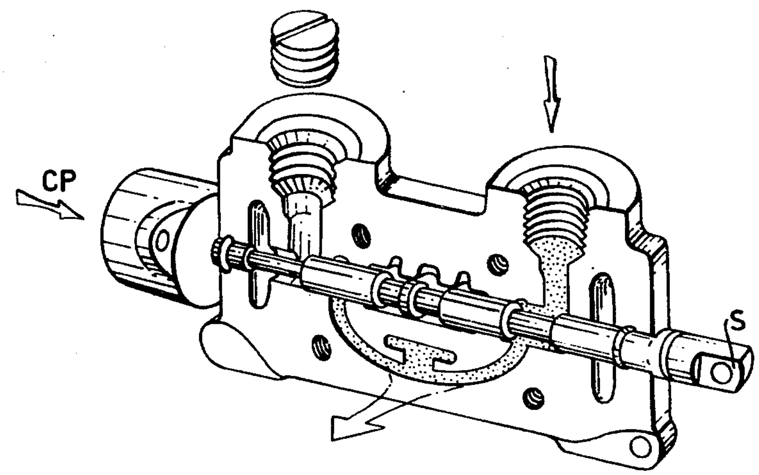
—F I G.3.—
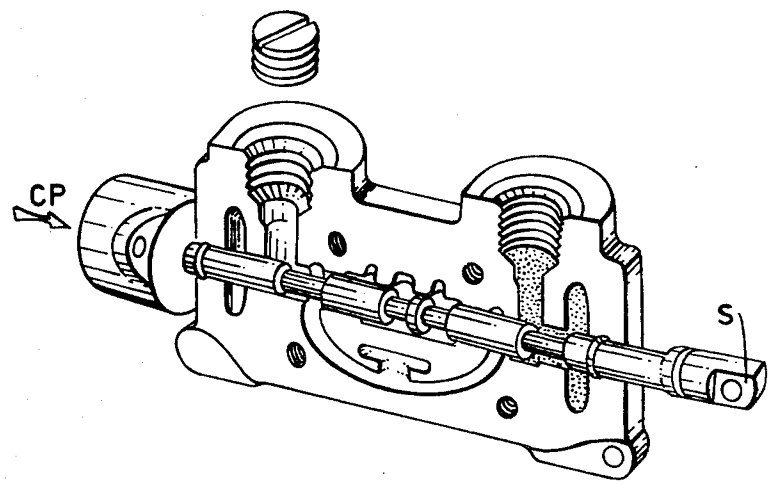
—F I G.4.—

FLUID TRANSMISSION CIRCUIT

The invention relates to fluid transmission circuits.

The invention is particularly concerned with fluid transmission circuits for use in vehicles, such as earth-working vehicles, which encounter widely fluctuating resistance to movement and which frequently have to be reversed. In such vehicles, it was the practice hitherto to couple the output from a prime mover to the vehicle wheels via a fluid transmission circuit in which swashplate pumps delivered the fluid. Such pumps were used because their output can be varied over a wide range in a controlled manner, to respond to the fluctuating demands placed on the transmission. They have, however, the drawback that they are relatively costly to install, and relatively complicated to maintain and to keep in constant service without frequent breakdown.

The primary object of the invention is to enable a fluid transmission circuit to have the wide response and controllable output of the known circuits, whilst being simpler and cheaper to construct and maintain in reliable service under heavy working conditions.

The inventive concept is based on the realisation that this can be achieved by dispensing with the costly and complicated swashplate pumps, and using instead a bank of gear-type pumps whose output is delivered to the final drive unit by a series of simple hydraulic reversing valves. In its broadest aspect, the invention provides a fluid transmission circuit in which three or more pumps, adapted to be driven in unison by a prime mover operating at constant power output, draw fluid from a reservoir and deliver it to a reversible fluid motor via a control valve incorporating forward, neutral and reverse positions, the motor being driven, when the circuit is in use, against a fluctuating resistive force, the fluid outputs of two or more of said pumps being controlled by the output of a diverting valve whose input is connected by a separate pressure-sensing line to the fluid flow passing through the motor and which is initially biassed into a position in which each of said fluid outputs from said pumps is delivered to the motor, the arrangement being such that, as the demands on the motor increase and the pressure of fluid passing through the motor rises through a succession of predetermined levels, the diverting valve will sense the rises in pressure and, at each successive pressure level, will automatically divert the fluid outputs of successive ones of said pumps back to the reservoir without passing through the motor, the pump outputs being automatically switched into the motor supply line again, one after the other and in the reverse order from that in which they were switched out, by the diverting valve as the demand on the motor subsequently falls.

One circuit embodying the invention is shown, by way of example only, in the accompanying drawings, and will now be described. In the drawings, FIG. 1 is a diagram of the circuit;

FIG. 2 shows, in greater detail, a control valve forming part of the circuit of FIG. 1; and FIGS. 3 and 4 show the valve of FIG. 2 in two alternative operating positions.

The circuit shown in the drawings is a hydraulic transmission circuit which operates effectively as an automatic four speed gear box. The circuit is driven by a prime mover PM, which may be a diesel or electric motor whose output drives a series of pumps 1-2-3-4 to draw fluid from a reservoir tank T and power a hydraulic motor MF. The motor MF in turn powers the wheels of a vehicle, such as an earth moving vehicle, in which the circuit and the prime mover PM are installed.

Overall control of the circuit is effected by movement of a control valve DV which has forward, neutral and reverse positions. When the driver of the machine puts the control valve DV into its forward position, with the prime mover PM running, hydraulic fluid flow from the tank T to the driving motor MF begins and the vehicle will move forward as the motor MF rotates its ground engaging wheels. Initially, if the vehicle is moving forward over fairly level ground and is under minimum condition of load, all the pumps 1-2-3-4 (which are on a common drive from the output of PM) will deliver hydraulic fluid to the motor MF, and the vehicle will attain its maximum speed and will continue to move forward at that speed as long as the control valve DV is kept in its maximum forward position.

As the resistance to vehicle movement increases—for example, if the vehicle encounters a gradient—the pressure of the hydraulic fluid applied to the motor MF will also increase. A pressure sensing line in the circuit monitors this increase in pressure through the motor MF, and (as FIG. 2 shows) transmits the sensed increase to a slave cylinder SC which operates a main control valve V-1-2-3. The valve is shown in detail in FIGS. 2 to 4, and is basically a spool valve which, when extended by predetermined amounts, successively re-directs the flows of fluid through the pumps 1,2 and 3 back to tank T: thus effectively causing the pumps to be successively "taken out" of the circuit between the prime mover PM and the driving motor MF as the pressure in the motor MF increases.

The operation of the valve can be seen from a study of FIGS. 2 to 4. A piston at one end of the valve spool is kept under constant pressure CP from a separate source, and when the pressure in the sensing line exceeds this constant pressure CP the slave cylinder SC operates the valve spool to switch the flow of hydraulic fluid from the appropriate pump straight back to the tank T instead of to the motor MF. In a practical embodiment, the valve V-1-2-3 would be a composite structure operating on three of the four pumps in the circuit of FIG. 1, whereas the valve shown in FIGS. 3 and 4 is a single valve which could operate on only one of those pumps.

Thus, the vehicle could start off moving along flat level ground with all four pumps operating; it could then encounter a gradient, causing a rise in the pressure in the sensing line and cause the slave cylinder SC to operate a first section of the valve V-1-2-3 and cut out pump 1 from the circuit; as the gradient increases, and the pressure in the sensing line rises still further, valve 2 is operated to dump the fluid output from pump 2 back to tank T; and if yet more resistance is encountered, valve 3 is operated to take pump 3 out of the circuit, thus leaving only pump 4 running and delivering fluid to motor MF.

Should the pressure rise still further, a relief valve RV will be lifted by pump 4, since this pump is not operated on by the control valve V-1-2-3 but has its output permanently connected to the motor MF. The relief valve RV could, for example, be set to lift when the pressure in the line from pump 4 to the motor MF is sufficient to cause wheel spin of the vehicle.

By moving the control valve DV into neutral, the flow from the pumps 1, 2, 3, 4 is all directed back to tank T, and as all working parts of the valve DV are closed in neutral this has the effect of stopping the vehicle.

Similarly by moving the valve DV into reverse the vehicle can be made to move backwards and the circuit will again operate as an automatic four speed gear box.

It will be appreciated that, because three out of the four pumps in this circuit are successively "taken out" as the demands from the motor MF increase, the circuit effectively adjusts the fluid flow so that the maximum horse power of the prime mover PM is constantly utilised. The circuit makes it possible to use simple gear-type pumps to achieve substantially the same control effect as the more costly infinitely variable swash plate type of pump. It is also, of course, much better to switch the fluid output from successive pumps back to tank rather than simply allowing them to lift a relief valve.

The valves V-1-2-3 can be adapted from standard fluid reversing valves, such as those available commercially from Commercial Hydraulics Limited of Bedford, England. In the specific embodiment just described, the gear pumps 1, 2, 3, 4 can also be obtained from this firm.

By way of example, one particular set of operating conditions for the circuit described and illustrated would be as follows:

With a prime mover of 40 horse-power driving the pumps 1, 2, 3, 4, as the vehicle moves forward on level ground all four pumps could be operating at six hundred pounds per square inch and delivering, respectively, 28.8, 14.5, 10.6 and 14.4 gallons per minute; as the gradient increases, the pressure in the sensing line could rise to eleven hundred pounds per square inch and pump 1 (delivering 28.8 gallons per minute) could be taken out; as the gradient increases further, the pressure in the sensing line could rise to 1500 pounds per square inch and cause the output of pump 2 (14.5 gallons per minute) to be dumped as well as that of pump 1; and as resistance increases still further, and the pressure in the sensing line rises to 1750 pounds per square inch, pump 3 (10.6 gallons per minute) could also be taken out in addition to the other two, leaving only pump 4 delivering 14.4 gallons per minute at 1750 pounds per square inch to the motor MF.

This last-mentioned condition, with only a single pump operating, could correspond to the "digging" drive transmission to the wheels of an earth-loading vehicle. The actual digging boom and bucket would of course, be powered by their own hydraulic circuit. The invention is particularly applicable to earth moving vehicles, which frequently have to be reversed and which have to traverse widely varying terrain and encounter wide fluctuations in resistance to movement, from unloaded level travel to "digging" or "ramming" situations.

As shown in FIG. 1, the system illustrated could be modified by coupling the drive from the prime mover PM to the bank of gear pumps 1-2-3-4 through the intermediary of a single large hydraulic pump HP (shown in broken line). The bank of pumps 1-2-3-4 are connected together mechanically so that they all rotate at the same speed. This has the effect of dividing the main fluid supply into predetermined flows, which are then dealt with by the valves as described above.

The scope of the invention is limited only by the claims which now follow.

I claim:

1. A fluid transmission circuit comprising in combination:

a prime mover capable of operating at constant power output;

a reservoir tank of hydraulic fluid;

a single large hydraulic pump having a fluid input connected with the reservoir tank for receiving hydraulic fluid and a fluid output for delivering pumped hydraulic fluid;

means connecting said prime mover to said large pump in driving relationship;

a bank of at least three smaller hydraulic pumps also connected in driving relationship with said prime mover so as to be driven in unison with each other and the large pump by said prime mover, and having fluid inputs connected with the fluid output of said large hydraulic pump to receive hydraulic fluid from the reservoir tank;

a reversible fluid motor coupled to a common fluid output of said bank of smaller pumps;

a control valve incorporating forward, neutral and reverse positions and being interposed in the fluid circuit between said bank of smaller pumps and said reversible motor;

a diverting valve means;

a pressure-sensing fluid line, separate from the fluid lines to and from said smaller pumps, connecting the input of the diverting valve means to the fluid flow passing through said reversible motor;

and means biassing said diverting valve means initially into a position in which each of the fluid outputs from said smaller pumps is delivered to said reversible motor, the arrangement being such that, as the demands on the motor increase and the pressure of fluid passing through the motor rises through a succession of predetermined levels, the pressure-sensing line will sense the rises in pressure and, at each successive pressure level, will cause the diverting valve means to automatically divert the fluid outputs of successive ones of said smaller pumps back to the reservoir tank without passing through the motor, the smaller pump outputs being automatically switched into the motor supply line again, one after the other and in reverse order from that in which they were switched out, by the diverting valve means as the demand on the motor subsequently falls.

2. A fluid transmission circuit as defined in claim 1 wherein: the diverting valve means comprises a plurality of individual diverting valves responsive independently to the pressure sensing line and connected respectively to the outputs of said at least three hydraulic pumps in the bank to receive the respective pump output flows whereby one diverting valve receives the output flow of one pump in the bank, the valves also being connected collectively with the reversible motor through the control valve, and with the reservoir tank independently of the control valve and motor, to deliver the respective pump output flows to the motor or to the tank depending upon the individual position of the diverting valve associated with a respective pump.

* * * * *